Feb. 23, 1937.                L. S. WILLIAMS                2,071,676
                         LENS FOR INDICATING DEVICES
                          Filed Jan. 31, 1936            2 Sheets-Sheet 1
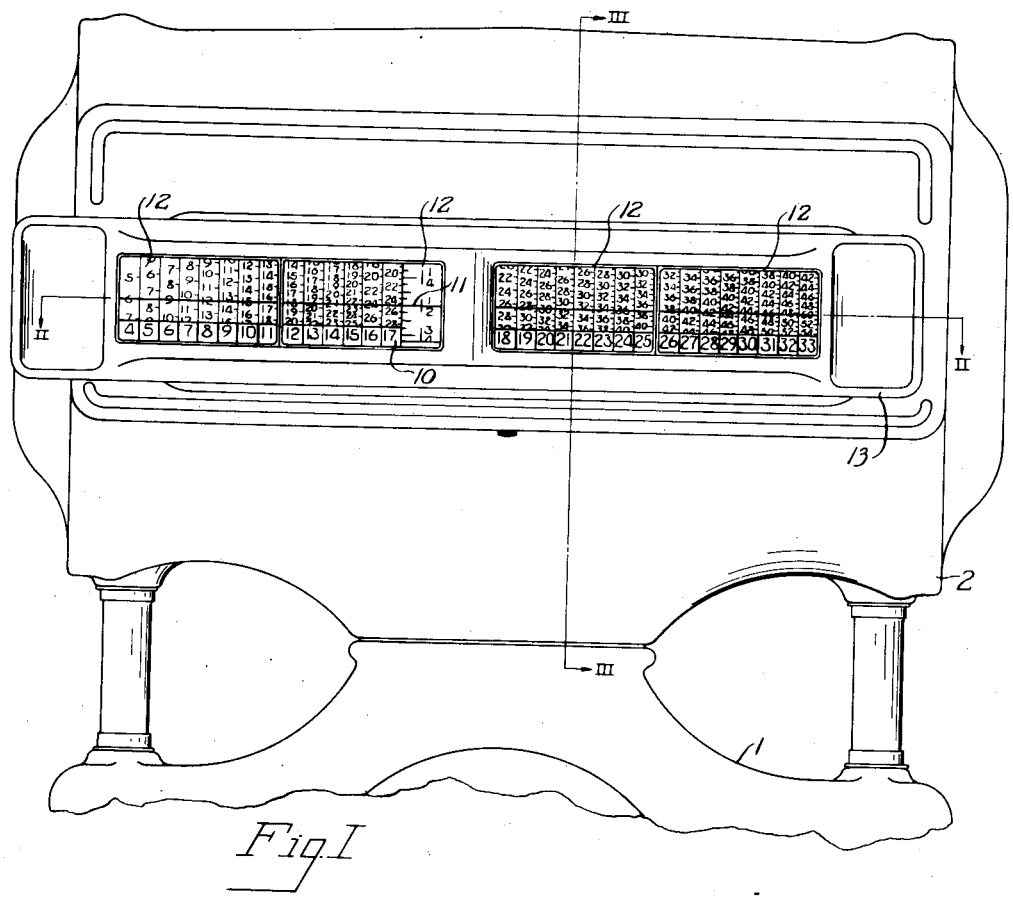
Fig. I
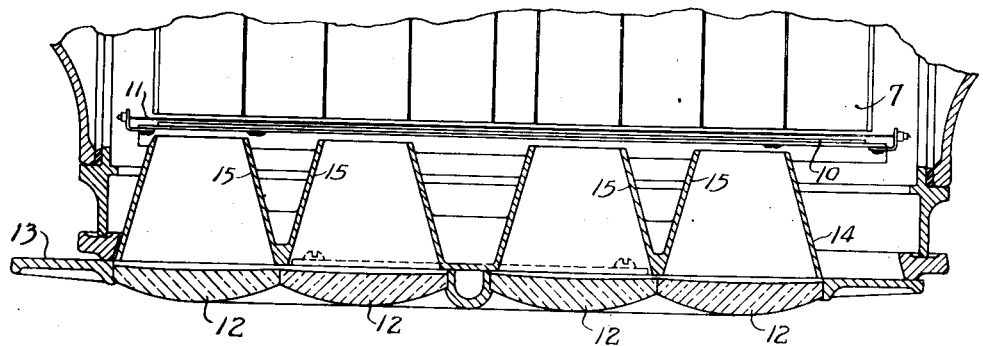
Fig. II
Lawrence S. Williams
INVENTOR
BY *B. M. Marshall*
ATTORNEY Feb. 23, 1937. L. S. WILLIAMS 2,071,676
LENS FOR INDICATING DEVICES
Filed Jan. 31, 1936  2 Sheets-Sheet 2
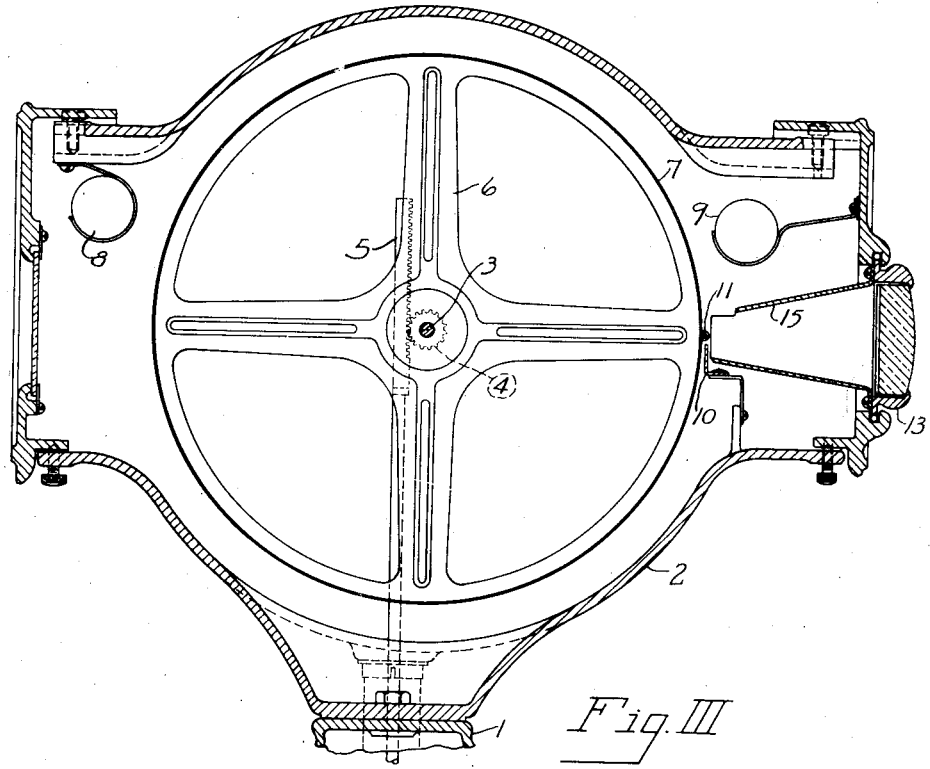
Fig. III
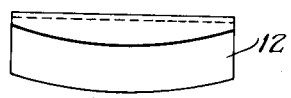
Fig. V
Fig. VI
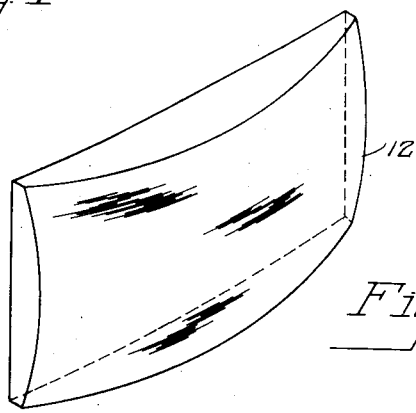
Fig. IV
Lawrence S. Williams
INVENTOR
BY *Marshall*
ATTORNEY Patented Feb. 23, 1937

2,071,676

UNITED STATES PATENT OFFICE 2,071,676

LENS FOR INDICATING DEVICES

Lawrence S. Williams, Toledo, Ohio, assignor to Toledo Scale Manufacturing Company, Toledo, Ohio, a corporation of New Jersey Application January 31, 1936, Serial No. 61,729

7 Claims. (Cl. 88—1)

This invention relates to lenses for indicating devices, particularly indicating devices of the type shown and described in United States Patent No. 1,973,685, to C. O. Marshall.

It is an object of the invention to provide lenses for such indicating devices which are capable of providing vertical magnification that is greater than their horizontal magnification and which exhibit less aberration when indicia are viewed through one of said lenses from a point at either side of a point directly in front.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a weighing scale embodying lenses of my invention;

Figure II is a sectional plan view taken substantially on the line II—II of Figure I;

Figure III is a side elevational view taken substantially on the line III—III of Figure I;

Figure IV is a view in perspective showing one of the lenses of my invention;

Figure V is an end view thereof; and

Figure VI is a top plan view thereof.

Referring to the drawings in detail, the indicating mechanism is supported on a frame 1 surmounted by a casing 2 within which is rotatably mounted a shaft 3 which carries a pinion 4 that meshes with a rack 5 which is moved by the lever mechanism (not shown) of the scale. Mounted upon the shaft 3 are spiders 6 surrounded by a thin aluminum chart 7 upon which indicia are printed. The chart is illuminated by lamps 8 and 9 located inside the casing 2.

Mounted inside the casing 2 and lying along the front of the chart 7 is a price indicator 10, and stretched in front of the chart 7 and lying above the price indicator 10 is a reading line 11. The chart 7, price indicator 10 and reading line 11 are visible through a series of lenses 12 which are mounted contiguously, i. e. in adjacent alignment in a shiftable frame 13, and carried by the shiftable frame 13, back of the lenses 12, is a cellular member 14 consisting principally of a series of frusto-pyramidal cells 15 having large open ends adjacent the respective lenses and small open ends adjacent the portions of the chart which are visible through the lenses.

In the form of device shown in the drawings the horizontal dimension of the portion of the chart which is visible through each lens is about half the horizontal dimension of the lens and in order to make this portion of the chart appear to be horizontally coextensive with the lens through which it is visible the horizontal dimension of the chart portion is magnified two times. With a series of lenses which magnify the horizontal dimensions of the visible portions of the chart two times, those portions of the chart appear as shown in Figure I of the drawings. If a spherical lens magnifying two diameters in all directions were employed, the vertical magnification would be the same as the horizontal magnification, but it has been found desirable to employ vertical magnification somewhat greater than two times in order to increase the apparent distance between the graduations on the chart. Heretofore this has been accomplished in lenses devised by the applicant by making the front face of the lens spherical and making its curvature such as to provide two times magnification in all directions, and making the back face of the lens in the form of a section of a horizontal cylinder. The vertical magnification resulting from the cylindrical form of the back of the lens was thus added to the magnification resulting from the spherical form of the front face of the lens and the resultant magnification of the lens was two times horizontally and more than two times vertically.

Lenses constructed as above described may cause the figures to appear quite distorted when viewed from positions at one side or the other of a point directly in front of the lens. Furthermore, it is difficult to produce such lenses with the horizontal axes of the cylindrical surfaces in exactly corresponding positions, and when such lenses are mounted in horizontal series in front of a reading line, the reading line appears to be offset or broken unless the axes of the cylindrical surfaces are in alignment. Because of the difficulty of producing lenses with the axes of the cylindrical surfaces in exactly corresponding positions, it has been found necessary to sort such lenses into sets of lenses in which the axes are in nearly corresponding positions. I have discovered that distortion can be greatly reduced by making the lenses in the form shown in Figures II, III, IV, V and VI, and that when lenses of the form shown in these figures are used with a reading line in the relationship illustrated in Figures II and III, manufacturing variations in the positions of the axes of the cylindrical surfaces do not cause the reading line to appear offset or broken.

In the lens of my invention as illustrated in Figures II, III, IV, V and VI, the front face of the lens is spherical, the curvature being such as to magnify the portion of the chart visible through the lens more than two times. The back of the lens, however, is concave in the form of a section of a cylinder having a vertical axis, the curvature being sufficient to detract sufficiently from the horizontal magnification of the lens to make the resultant horizontal magnification two times. Since the concave back of the lens is curved about a vertical axis, the back formation does not detract from the vertical magnification of the lens. If the horizontal dimension of the portion of the chart visible through each lens were made about one-third the horizontal dimension of the lens, the lens would be constructed to magnify the horizontal dimension of the chart three times, as the horizontal magnification should make the visible portion of the chart appear horizontally coextensive with the lens. When viewed with the lens of my invention, the indicia on the chart appears relatively undistorted, even though the position from which the indicia is viewed be at one side or the other of a point directly in front of the lens.

The invention herein shown and described is to be regarded as illustrative only, and it is to be understood that the invention is susceptible to variation, modification and change within the spirit and scope of the subjoined claims.

Having described my invention, I claim:

1. In an indicating device, in combination, a horizontal series of lenses arranged in contiguous relation, each of said lenses having a spherical front face and a concave back in the form of a cylindrical surface curved about a vertical axis, a hollow lens cell positioned back of each lens and having an opening adjacent such lens, the horizontal dimension of such opening being substantially coextensive with the horizontal dimension of such lens, and a chart lying back of said lens cell, a virtual image of a portion of said chart being visible through said lens and cell, said cell having an opening lying adjacent said chart, the magnification resulting from the spherical contour of the front of said lens being substantially greater than the ratio of the horizontal dimension of the first said opening to the horizontal dimension of the second said opening and the curvature of the back of said lens being sufficient to cause the resultant horizontal magnification of said lens to be substantially equal to the ratio of the horizontal dimension of the first said opening to the horizontal dimension of the second said opening.

2. In an indicating device, in combination, a horizontal series of lenses arranged in contiguous relation, each of said lenses having a spherical front face and a concave back in the form of a cylindrical surface curved about a vertical axis, a hollow lens cell positioned back of each lens and having an opening adjacent such lens, the horizontal dimension of such opening being substantially coextensive with the horizontal dimension of such lens, and a chart lying back of said lens cell, a virtual image of a portion of said chart being visible through said lens and cell, said cell having an opening lying adjacent said chart.

3. In an indicating device, in combination, a horizontal series of lenses arranged in contiguous relation, each of said lenses having a spherical front face and a concave back in the form of a cylindrical surface curved about a vertical axis, and a hollow lens cell positioned back of each lens.

4. In an indicating device, in combination, a horizontal series of lenses arranged in contiguous relation, each of said lenses having a spherical front face and a concave back in the form of a cylindrical surface curved about a vertical axis.

5. In an indicating device, in combination, a horizontal series of lenses arranged in contiguous relation, each of said lenses having a spherical front face and a concave back in the form of a cylindrical surface curved about a vertical axis, the curvature of the front face of each of said lenses being sufficient to cause magnification of more than two times and the curvature of the concave back of each of said lenses being sufficient to reduce the resultant horizontal magnification of each of said lenses to substantially two times.

6. In an indicating device, in combination, a chart, a reading line lying along said chart, and a plurality of adjacent lenses arranged in front of said reading line, each of said lenses having a convex spherical face and a concave cylindrical face, said cylindrical faces being curved about axes extending at right angles to the direction of extension of said reading line.

7. In an indicating device, in combination, a chart, a horizontal reading line extending along said chart, and a plurality of lenses arranged side by side in front of said reading line, each of said lenses having a convex spherical face and a concave cylindrical face, said cylindrical faces being curved about vertical axes.

LAWRENCE S. WILLIAMS.